United States Patent
Yamada et al.

(10) Patent No.: US 7,045,240 B2
(45) Date of Patent: May 16, 2006

(54) POWER GENERATING APPARATUS HAVING A PROTON CONDUCTOR UNIT THAT INCLUDES A FULLERENE DERIVATIVE

(75) Inventors: Atsuo Yamada, Kanagawa (JP); Hisashi Kajiura, Kanagawa (JP); Masashi Shiraishi, Tokyo (JP); Ryuichiro Maruyama, Kanagawa (JP); Yasuhiro Watanabe, Tokyo (JP); Takahiro Nakamura, Kanagawa (JP); Hiroshi Miyazawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 288 days.

(21) Appl. No.: 10/466,860

(22) PCT Filed: Jan. 9, 2002

(86) PCT No.: PCT/JP02/00055

§ 371 (c)(1),
(2), (4) Date: Jul. 15, 2003

(87) PCT Pub. No.: WO02/056405

PCT Pub. Date: Jul. 18, 2002

(65) Prior Publication Data
US 2004/0058213 A1  Mar. 25, 2004

(30) Foreign Application Priority Data
Jan. 15, 2001 (JP) ............................ 2001-006441

(51) Int. Cl.
   *H01M 8/10* (2006.01)
(52) U.S. Cl. ............................ 429/33; 429/41; 429/46
(58) Field of Classification Search .................. 429/33, 429/40, 41, 46
See application file for complete search history.

(56) References Cited

U.S. PATENT DOCUMENTS

| | | | | |
|---|---|---|---|---|
| 5,399,184 A | * | 3/1995 | Harada | 29/623.4 |
| 5,653,951 A | * | 8/1997 | Rodriguez et al. | 423/439 |
| 5,728,483 A | * | 3/1998 | Fujitani et al. | 429/12 |
| 5,962,155 A | * | 10/1999 | Kuranaka et al. | 429/20 |
| 6,057,051 A | * | 5/2000 | Uchida et al. | 429/19 |
| 6,106,801 A | * | 8/2000 | Bogdanovic et al. | 423/648.1 |
| 6,495,290 B1 | * | 12/2002 | Hinokuma et al. | 429/231.8 |
| 6,777,133 B1 | * | 8/2004 | Hinokuma et al. | 429/231.8 |
| 6,821,665 B1 | * | 11/2004 | Hinokuma et al. | 429/33 |

FOREIGN PATENT DOCUMENTS

| | | |
|---|---|---|
| EP | 0 788 172 A1 | 6/1997 |
| JP | 3-167712 | 7/1991 |
| JP | 6-60895 | 3/1994 |
| JP | 8-31444 | 2/1996 |

(Continued)

Primary Examiner—Mark Ruthkosky
(74) Attorney, Agent, or Firm—Bell, Boyd, Lloyd LLC (57) ABSTRACT

A power generating apparatus includes a proton conductor unit, containing a fullerene derivative, a hydrogen electrode bonded to one surface of the proton conductor unit, an oxygen electrode bonded to the other surface of the proton conductor unit, and a hydrogen gas supplying unit for supplying a hydrogen gas at a pressure of approximately 0.2 to approximately 3.5 atm to the hydrogen electrode. The present power generating apparatus effectively suppresses transmission of hydrogen and oxygen gases so that it is possible to prevent the hydrogen gas from being emitted to atmosphere due to transmission as well as to prevent the oxygen gas from reaching the hydrogen electrode on transmission to prevent the hydrogen gas from being consumed without contributing to power generation.

9 Claims, 5 Drawing Sheets

FOREIGN PATENT DOCUMENTS

| | | |
|---|---|---|
| JP | 8-115732 | 5/1996 |
| JP | 8-222252 | 8/1996 |
| JP | 9-213359 | 8/1997 |
| JP | 2000-264602 | 9/2000 |
| WO | WO97/27637 | 7/1997 |
| WO | WO 01/06519 | 1/2001 |

* cited by examiner

POWER GENERATING APPARATUS HAVING A PROTON CONDUCTOR UNIT THAT INCLUDES A FULLERENE DERIVATIVE

This invention relates to a power generating apparatus and, more particularly, to a power generating apparatus in which transmission of hydrogen and oxygen gases is suppressed effectively to raise the power generation efficiency.

BACKGROUND OF THE INVENTION

Up to now, fossil fuels, such as gasoline or light oil, has been used extensively not only as a source of energy for cars but also as a source of energy for power generation. Through the exploitation of this fossil fuel, the mankind could benefit from drastic improvement in life level and from remarkable industrial development. On the other hand, the earth is imperiled by the severe danger of environmental destruction, while depletion of the resources of the fossil fuel is feared to occur such that skepticism is entertained as to the prospect of its stable supply in the long term.

Hydrogen is contained in water and hence exists abundantly on earth. Moreover, it has a large chemical energy contained per unit mass, while it does not emit harmful gases or global warming gases when used as an energy source. For this reason, hydrogen is attracting general attention as a clean and plentiful energy source which should take the place of the fossil fuel.

Recently, researches and developments in electrical energy generating apparatus, capable of taking out the electrical energy from the hydrogen energy are going on briskly, such that there is a promising outlook towards application to large-scale power generation or on-site autogenous power generation and as a power source for cars.

An electrical energy generating apparatus for taking out the electrical energy from the hydrogen energy, that is a fuel cell, includes a hydrogen electrode, supplied with hydrogen, and an oxygen electrode, supplied with oxygen. Hydrogen supplied to a hydrogen electrode is dissociated by a catalytic action into protons and electrons. The electrons are collected by a current collector of the hydrogen electrode, while the protons are transported to the oxygen electrode. The electrons, collected by the hydrogen electrode, are transported through a load to the oxygen electrode. On the other hand, oxygen supplied to the oxygen electrode is bonded by a catalytic action to the protons and electrons, transported from the hydrogen electrode through a proton conducting film, to yield water. In this manner, an electromotive force is generated across the hydrogen electrode and the oxygen electrode to cause the current to flow through the load.

If hydrogen supplied to the hydrogen electrode directly reaches the oxygen electrode to react with oxygen or conversely the oxygen gas supplied to the oxygen electrode directly reaches the hydrogen electrode to react with hydrogen, the power generation efficiency is lowered because the power generated by this reaction is not passed through the load. That is, for raising the power generation efficiency, it is necessary to provide a proton conducting film whereby transmission of the hydrogen and oxygen gases therethrough is suppressed while efficient proton conduction therethrough is allowed. As such, a proton conduction film, a perfluorosulfonic acid resin, has so far been used.

The perfluorosulfonic acid resin is not optimum in its ability to suppress transmission of hydrogen and oxygen gases therethrough, such that, if this perfluorosulfonic acid resin is used as a proton conductor film, it has been difficult to raise the power generating efficiency sufficiently.

SUMMARY OF THE INVENTION

In view of the above depicted status of the art, it is an object of the present invention to provide a power generating apparatus whereby transmission of the hydrogen and oxygen gases is suppressed effectively to raise the power generation efficiency.

The power generating apparatus, according to the present invention, proposed for accomplishing the above object, includes a proton conductor unit having, as a matrix, a carbonaceous material which is mainly composed of carbon and into which proton dissociating groups are introduced, a hydrogen electrode bonded to one surface of the proton conductor unit, an oxygen electrode bonded to the other surface of the proton conductor unit, and means for supplying a hydrogen gas at a pressure of approximately 0.2 to 3.5 atm to the hydrogen electrode.

The power generation apparatus of the present invention uses, as a proton conductor unit, a material which is comprised of a carbonaceous material, composed mainly of carbon, as a matrix material, and into which are introduced proton dissociating groups. Moreover, since the hydrogen gas is supplied at a pressure of approximately 0.2 to 3.5 atm to the hydrogen electrode, transmission of the hydrogen and oxygen gases may be suppressed effectively. In addition, there is substantially no risk of the hydrogen gas being emitted to atmosphere on transmission or of the oxygen gas reaching the hydrogen electrode on transmission to be consumed thereat without contributing to power generation.

According to the present invention, the proton conductor unit preferably includes a fullerene derivative.

The power generation apparatus includes a hydrogen occluding material and a hermetically sealable vessel in which the hydrogen occluding material is enclosed.

According to the present invention the hydrogen emitting equilibrium pressure of the hydrogen occluding material is approximately 0.2 to 3.5 atm, whereby transmission of the hydrogen and oxygen gases may be effectively suppressed without the necessity of adjusting the hydrogen gas pressure by a regulator.

The power generation apparatus may include a regulator for adjusting the pressure of the hydrogen gas supplied to the hydrogen electrode to approximately 0.2 to approximately 3.5 atm, whereby transmission of the hydrogen and oxygen gases may be effectively suppressed even if the hydrogen emitting equilibrium pressure of the hydrogen occluding material is not approximately 0.2 to 3.5 atm.

The power generation apparatus according to the present invention is so designed that an apparatus portion made up of the proton conductor unit, hydrogen electrode and the oxygen electrode and the supplying unit are designed to be removable. This power generation apparatus may be used with advantage as a power supply for a portable equipment.

In the power generation apparatus according to the present invention, the hydrogen occluding material is a hydrogen occluding alloy, which hydrogen occluding alloy is loaded with $LaNi_5$.

The hydrogen occluding material is a carbonaceous hydrogen occluding material.

The carbonaceous hydrogen occluding material is at least one material selected from the group consisting of fullerene, carbon nano-fibers, carbon nano-tubes, carbon soot, nanocapsules, Bucky onion and carbon fibers.

The hydrogen occluding material is an alkali metal halide, an aqueous solution or a gel thereof.

According to the present invention, the proton conductor unit contains where $2 \leqq x$ and $y \leqq 12$ The power generation apparatus further includes a hydrogen tank and a regulator for adjusting the pressure of the hydrogen gas supplied from the hydrogen tank to approximately 0.2 to approximately 3.5 atm.

Other objects, features and advantages of the present invention will become more apparent from reading the embodiments of the invention.

DETAILED DESCRIPTION OF THE INVENTION

Referring to the drawings, a power generating apparatus according to the present invention is explained in detail.

Figure 1:
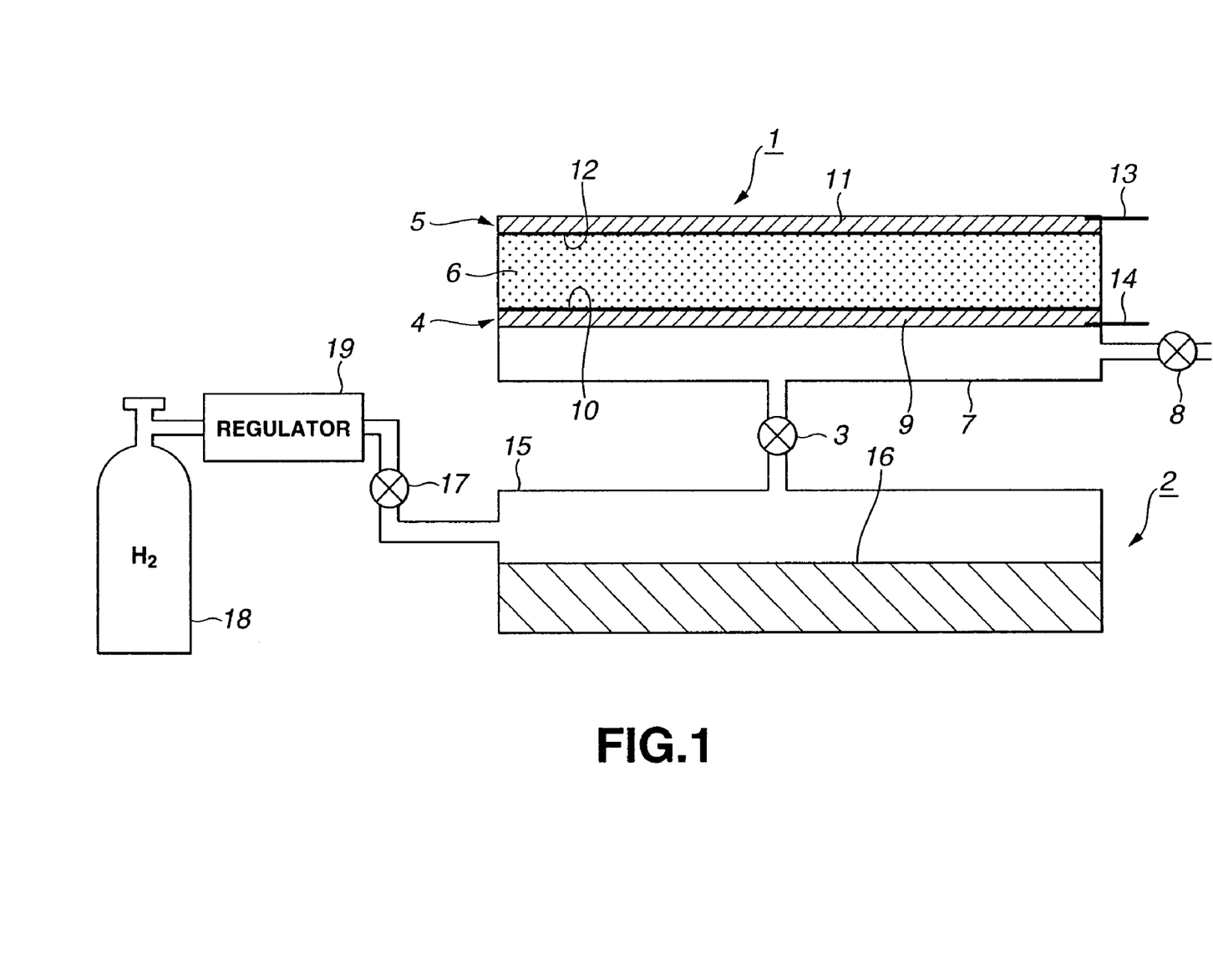
FIG. 1 schematically shows the structure of a power generating apparatus according to the present invention.

Referring to FIG. 1, the power generating apparatus according to the present invention includes a main body portion of the power generating unit 1, where power generation actually occurs, a hydrogen gas supplying unit 2 for supplying a hydrogen gas to the main body portion of the power generating unit 1, and a valve 3 provided between the main body portion of the power generating unit 1 and the hydrogen gas supplying unit 2.

The main body portion of the power generating unit 1 includes a hydrogen electrode 4, as a fuel electrode, an oxygen electrode 5, a proton conductor unit 6 of a fullerene derivative, sandwiched between the hydrogen electrode 4 and the oxygen electrode 5, a hermetically sealable vessel 7, overlying the hydrogen electrode 4, and a valve 8. In the present specification, a compound unit made up by the hydrogen electrode 4, oxygen electrode 5 and the proton conductor unit 6 is sometimes termed a membrane electrode assembly (MEA).

The hydrogen electrode 4 is formed by an electrode substrate 9 of a carbon-containing material, and a catalytic layer 10, formed thereon. Similarly, the oxygen electrode 5 is formed by an electrode substrate 11 of a carbon-containing material, and a catalytic layer 12, formed on its surface. The catalyst may be exemplified by platinum, platinum alloys, palladium, magnesium, titanium, manganese, lanthanum, vanadium, zirconium, nickel-lanthanum alloys, titanium-iron alloys, iridium, rhodium and gold. Of these; platinum and platinum alloys are preferred. An anode lead 13 is derived from the electrode substrate 11 of the oxygen electrode 5, while an anode lead 14 is derived from the electrode substrate 9 of the hydrogen electrode 4, as shown in FIG. 1. The cathode lead 13 and the anode lead 14 are connected to a load, not shown.

The proton conductor unit 6 is a film that prevents and permits transmission of the hydrogen gas and protons, respectively. Although no particular limitations are imposed on the material of the proton conductor unit 6, it is preferred to use a carbonaceous material, made up mainly of carbon and into which are introduced proton dissociating groups. The 'proton dissociating groups' mean 'functional groups from which protons may be dissociated on electrolytic dissociation'.

Any optional material may be used as the carbonaceous material, forming a matrix material of the proton conductor unit 6, provided that its predominant component is carbon. It is however necessary that the material exhibits ionic conductivity, following introduction of the proton dissociating groups, which is higher than electron conductivity. The carbonaceous material, as a matrix material, may specifically be enumerated by carbon clusters, which is an aggregate of carbon atoms, and a carbonaceous material containing carbon tubes.

Among a variety of the carbon clusters, fullerene, a material having a fullerene structure at least a portion of which has open ends, and a material having a diamond structure. The carbon clusters are not limited to these and may be any material which has ionic conductivity, following introduction of the proton dissociating groups, which is higher than electron conductivity.

As the carbonaceous material, forming a matrix for the proton conductor unit 6, it is desirable to use fullerene. It is desirable to use a material composed of fullerene into which have been introduced proton dissociating groups, such as —OH groups, —OSO$_3$H groups, —COOH groups, —SO$_3$H groups and —OPO(OH)$_2$ groups, as a material for the proton conductor unit 6.

The hermetically sealable vessel 7 can be completely sealed on closing the valves 3 and 8. However, on opening the valve 3, a hydrogen gas is supplied to the vessel from the hydrogen gas supplying unit 2, whereas, on opening the valve 8, the vessel is opened to atmosphere.

Meanwhile, the oxygen electrode 5 is opened to atmosphere, as shown in FIG. 1.

The hydrogen gas supplying unit 2 includes a hermetically sealable vessel 15, a hydrogen occlusive material 16, provided within the hermetically sealable vessel 15, and a valve 7. The hydrogen occlusive material 16 may be a hydrogen occlusive alloy or a carbonaceous hydrogen occlusive material. This hydrogen occlusive material 16 is able to occlude a hydrogen gas by being supplied with the hydrogen gas at a pressure not less than a preset pressure (hydrogen emitting equilibrium pressure) which is different with different sorts of the material used. The occluded hydrogen gas is discharged at a pressure which is less than a preset pressure (hydrogen emitting equilibrium pressure) differing with different sorts of the material used. It is possible to use an alkali metal hydride, an aqueous solution or a gel thereof, as the hydrogen occlusive material 16, and to emit the hydrogen gas with a ruthenium catalyst or a nickel catalyst.

The hermetically sealable vessel 15 may be completely hermetically sealed by closing the valves 3 and 17. If the valve 3 is opened, a hydrogen gas may be supplied to the main body portion of the power generating unit 1, whereas, if the valve 17 is opened, the hydrogen gas may be supplied to the hermetically sealable vessel 15 from a hydrogen tank 18 through a regulator 19.

In the above-described power generating apparatus, the method of getting hydrogen occluded in the hydrogen occlusive material 16 in the hydrogen gas supplying unit 2 is explained.

For getting hydrogen occluded in the hydrogen occlusive material 16, the valve 3 is closed, while the valve 17 is opened. The pressure of the hydrogen gas, supplied from the hydrogen tank 18, is adjusted to a pressure which is sufficiently higher than the hydrogen emitting equilibrium pressure of the hydrogen occlusive material 16. Since this causes the hydrogen gas, which is at a pressure sufficiently higher than the hydrogen emitting equilibrium pressure of the hydrogen occlusive material 16, to be charged into the hermetically sealable vessel 15 of the hydrogen gas supplying unit 2, the hydrogen gas is occluded into the hydrogen occlusive material 16. After a sufficient amount of hydrogen has been occluded in this manner into the hydrogen occlusive material 16, the valve 17 is closed to complete a sequence of operations.

The method of generating the power by the main body portion of the power generating unit 1, using hydrogen occluded into the hydrogen occlusive material 16, is hereinafter explained.

For generating the power by the main body portion of the power generating unit 1, the valve 8 is closed, while the valve 3 is opened. This charges the hydrogen gas into the hermetically sealable vessel 7 to its plenum state. At this time, the pressure of the hermetically sealable vessel 7 is substantially equal to the hydrogen emitting equilibrium pressure of the hydrogen occlusive material 16. It should be noted that, if desired to raise the purity of the hydrogen gas in the hermetically sealable vessel 7, it is sufficient if the valve 8 is transiently opened for a preset time period directly after opening the valve 3.

The hydrogen gas, supplied in this manner into the inside of the hermetically sealable vessel 7, reaches the catalytic layer 10, formed on the surface of the electrode substrate 9 of a carbon-containing material, through the electrode substrate 9, and is dissociated by a catalytic action into protons and electrons. Of these, the electrons migrate through the electrode substrate 9 to the anode lead 14 so as to be thence supplied to a load, not shown, while protons migrate through the proton conductor unit 6 towards the oxygen electrode 5. Since the oxygen electrode 5 is opened to atmosphere, the oxygen gas contained in air is transmitted through the carbon-containing electrode substrate 11 to reach the catalytic layer 12, formed on its surface, and is bonded to protons supplied from the proton conductor unit 6 and to electrons supplied from the load via cathode lead 13, under the catalytic action, to yield water. In this manner, the desired electromotive force is taken out.

In this case, the oxygen electrode 5 is opened to atmosphere, while the hydrogen electrode 4 is at a pressure substantially equal to the hydrogen emission equilibrium pressure by the hermetically sealable vessel 7, so that a resulting pressure difference is applied to the proton conductor unit 6. If this pressure difference is within a preset range, the proton conductor unit 6 is able to prohibit the hydrogen and oxygen gases from being transmitted therethrough. If this pressure difference exceeds the preset range, transmission occurs through the hydrogen gas and/or the oxygen gas.

Figure 2A:
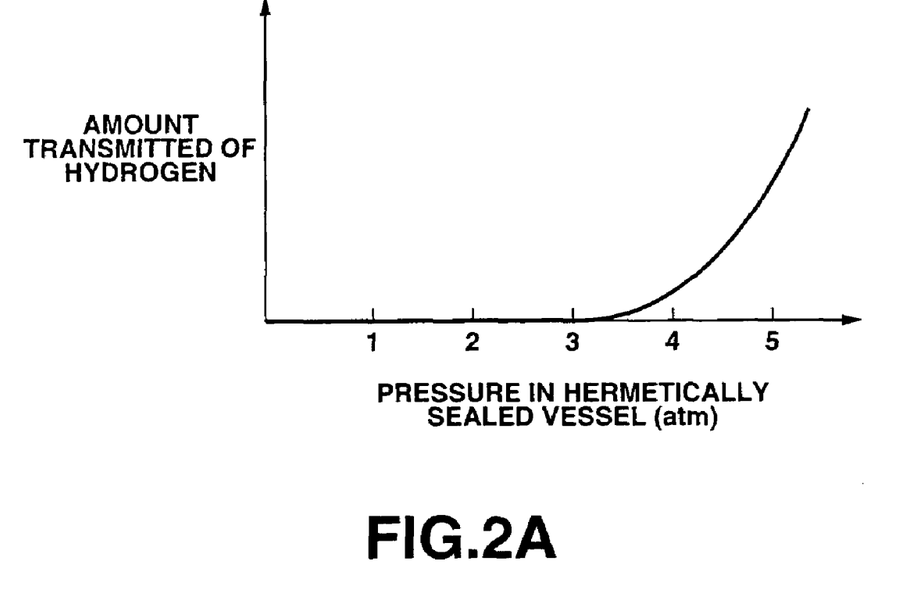
FIG. 2A is a graph showing the pressure of a hermetically sealable vessel, plotted against the amount of hydrogen transmitted through a proton conductor
Figure 2B:
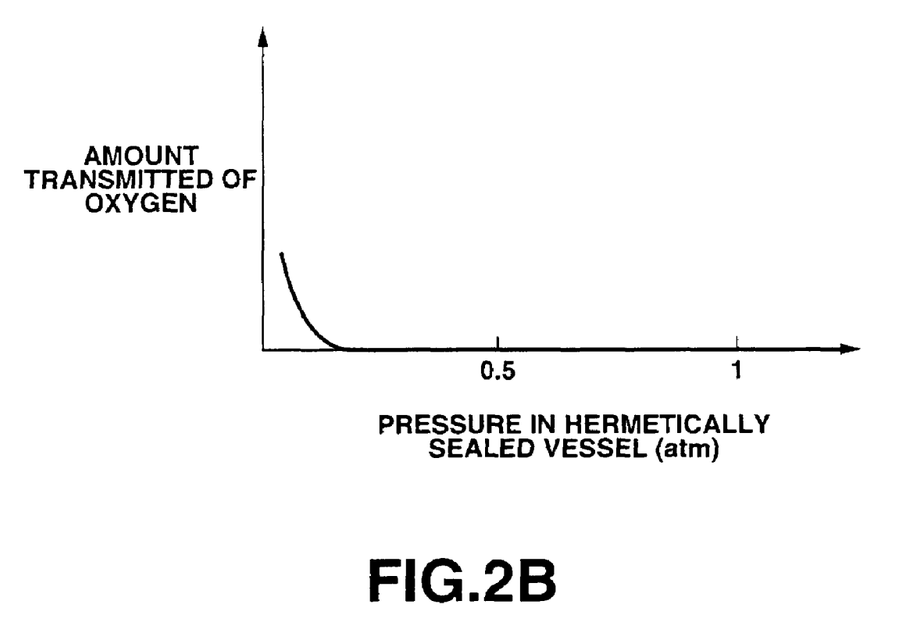
FIG. 2B is a graph showing the pressure of a hermetically sealable vessel, plotted against the amount of oxygen transmitted through a proton conductor.

FIG. 2A is a graph in which the pressure in the hermetically sealable vessel 7 is plotted against the amount of hydrogen transmitted through the proton conductor unit 6, while FIG. 2B is a graph in which the pressure in the hermetically sealable vessel 7 is plotted against the amount of oxygen transmitted hydrogen transmitted through the proton conductor unit 6.

In FIGS. 2A and 2B, a fullerene derivative of the form of $C_{60}$—$(OSO_3H)_x(OH)_y$, where $2 \leq x$ and $y \leq 12$ was used as the proton conductor unit 6. This fullerene derivative was mixed with vinyl chloride at a ratio of 5:1, using THF as a solvent, and the resulting mixture was coated on a glass substrate in accordance with a doctor blade method. After drying, the resulting product was pressed to form a thin film 25 µm in thickness. The pressing is desirably carried out at 0.05 to 10 t/cm$^2$.

It may be seen from FIG. 2A that, if the pressure in the hermetically sealable vessel 7 is not higher than 3.5 atm, the hydrogen gas is not transmitted through the proton conductor unit 6, however, if the pressure in the hermetically sealable vessel 7 exceeds about 3.5 atm, the hydrogen gas commences to be transmitted through the proton conductor unit 6 and, the higher the pressure in the hermetically sealable vessel 7 than this value, the larger becomes the amount of its transmission. Thus, for prohibiting transmission of the hydrogen gas towards the oxygen electrode 5 for thereby raising the power generation efficiency, the pressure in the hermetically sealable vessel 7 needs to be kept at approximately 3.5 atm or less.

It may also be seen from FIG. 2B that, if the pressure in the hermetically sealable vessel 7 is not lower than approximately 0.2 atm, the oxygen gas is not transmitted through the proton conductor unit 6, however, if the pressure in the hermetically sealable vessel 7 is lower than approximately 0.2 atm, the oxygen gas commences to be transmitted through the proton conductor unit 6 and, the lower the pressure in the hermetically sealable vessel 7 than this value, the larger becomes the amount of transmission. Thus, for prohibiting transmission of the oxygen gas towards the hydrogen electrode 4 for thereby raising the power generation efficiency, the pressure in the hermetically sealable vessel 7 needs to be kept at approximately 0.2 atm or higher.

Thus, it may be seen that, if the pressure in the hermetically sealable vessel 7 is in a range from about 0.2 atm to about 3.5 atm, there is substantially no risk of the hydrogen gas being transmitted from the hydrogen electrode 4 towards the oxygen electrode 5 or of the oxygen gas being transmitted from the oxygen electrode 5 towards the hydrogen electrode 4, thus raising the power generation efficiency.

If, in the present embodiment, the pressure in the hermetically sealable vessel 7 is to be kept in a range from about 0.2 atm to about 3.5 atm, it is sufficient if such hydrogen occlusive material 16 which has the hydrogen emission equilibrium pressure of from about 0.2 atm to about 3.5 atm is used. Such hydrogen occlusive material 16 may be enumerated by LaNi$_5$, as a hydrogen occlusive alloy, and by fullerene, carbon nano-fibers, carbon nano-tubes, carbon soot, nano-capsules, Bucky onion or carbon fibers, as a carbonaceous hydrogen occlusive material. It is also possible to use alkali metal hydrides, their aqueous solutions or gels, and to cause emission of the hydrogen gas with a ruthenium catalyst or a nickel catalyst.

On the other hand, for keeping the pressure in the hermetically sealable vessel 7 of the present embodiment in a range of approximately 0.2 atm to approximately 3.5 atm, a regulator may be interposed between the main body portion of the power generating unit 1 and the hydrogen gas supplying unit 2.

Figure 3:
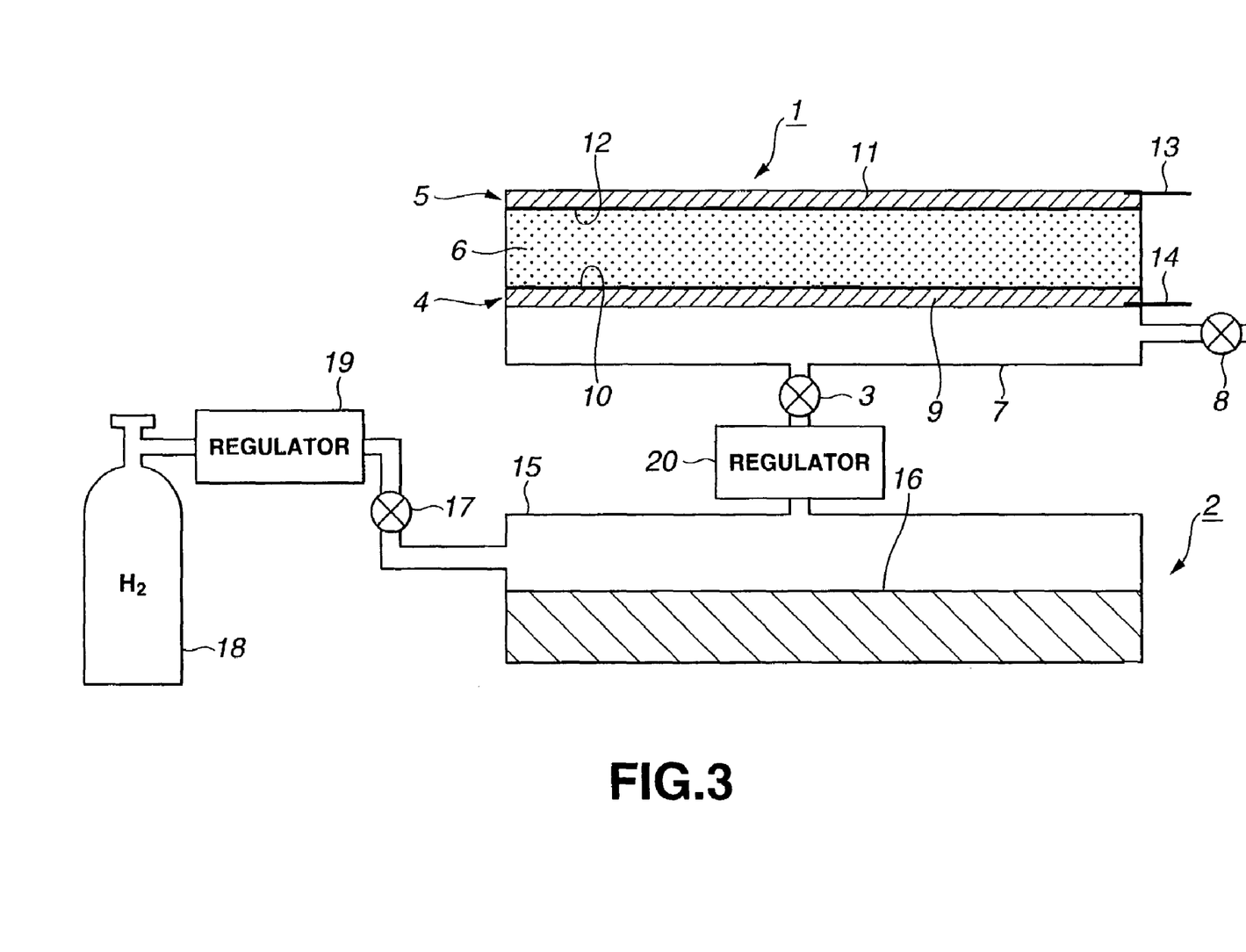
FIG. 3 shows an embodiment wherein a regulator is interposed between a main body unit of a power generating unit and a hydrogen gas supplying unit.

FIG. 3 shows an embodiment in which such regulator 20 is interposed between the main body portion of the power generating unit 1 and the hydrogen gas supplying unit 2.

In the present embodiment, the pressure under which hydrogen is supplied from the hydrogen gas supplying unit 2 to the main body portion of the power generating unit 1 is adjusted by the regulator 2 to approximately 0.2 atm to approximately 3.5 atm, whereby the pressure in the hermetically sealable vessel 7 is kept at approximately 0.2 atm to approximately 3.5 atm.

In the present invention, it is also possible to omit the hydrogen gas supplying unit 2 and to keep the pressure in the hermetically sealable vessel 7 to approximately 0.2 atm to approximately 3.5 atm.

Figure 4:
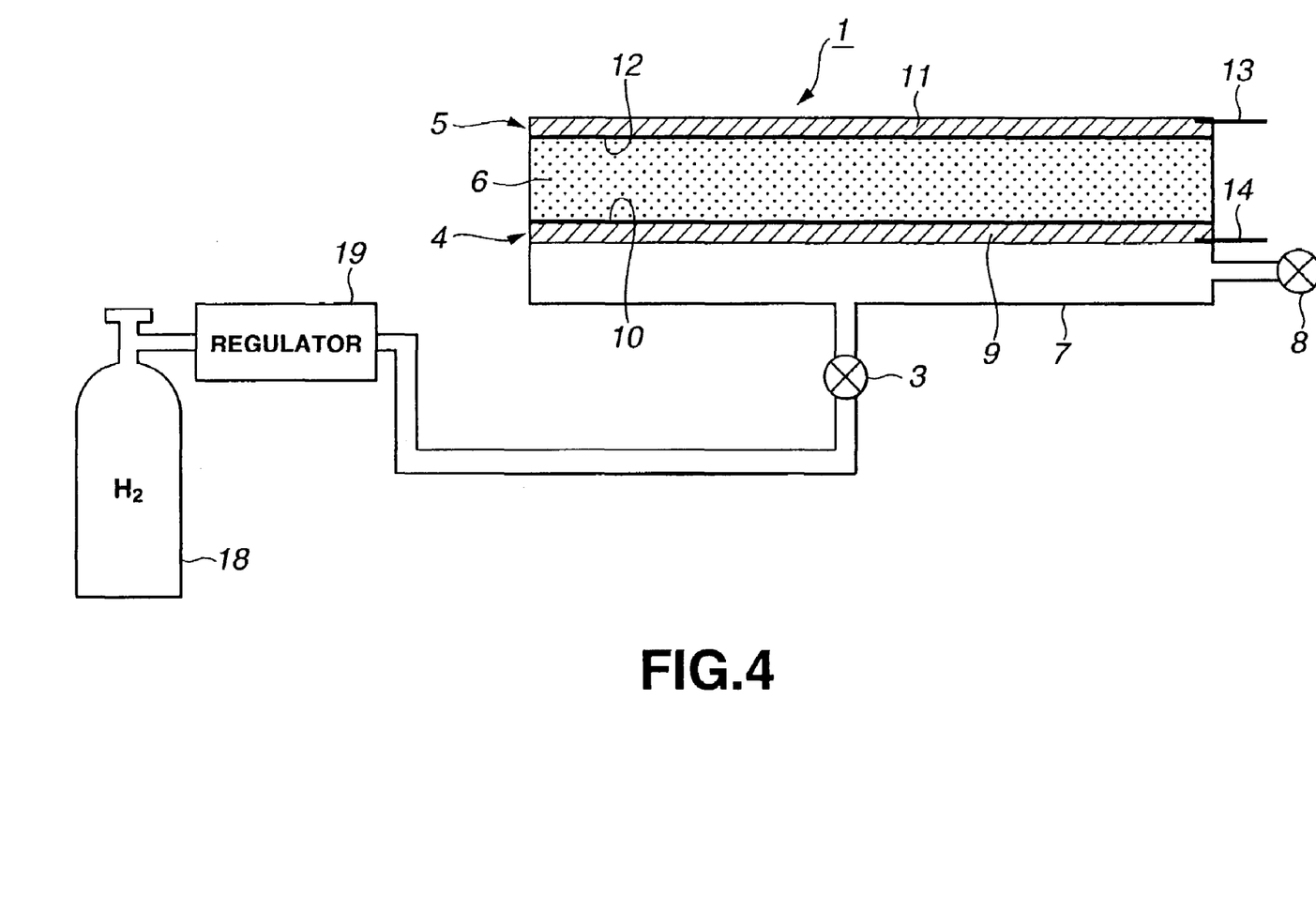
FIG. 4 shows an embodiment where the hydrogen gas supplying unit is omitted.

FIG. 4 shows an embodiment in which the hydrogen gas supplying unit 2 has been omitted.

In the present embodiment, the hydrogen gas is directly supplied from the hydrogen tank 18 to the main body portion of the power generating unit 1 at a supply pressure which is adjusted by the regulator 19 to approximately 0.2 atm to approximately 3.5 atm. This keeps the pressure in the hermetically sealable vessel 7 at approximately 0.2 atm to approximately 3.5 atm.

In the present embodiment, the main body portion of the power generating unit 1 may be removably mounted to the hydrogen gas supplying unit 2.

Figure 5:
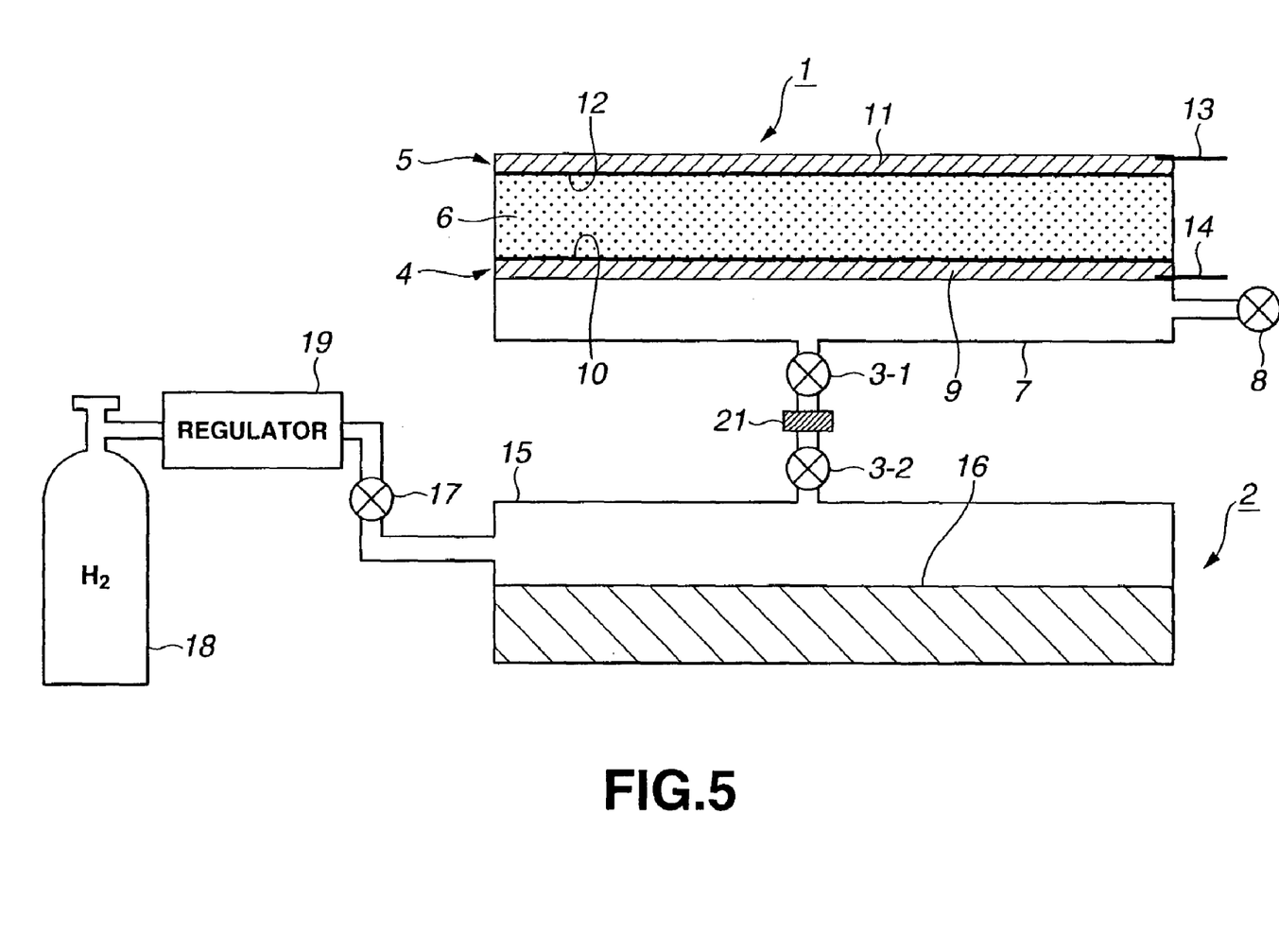
FIG. 5 shows an embodiment where the main body unit of the power generating unit is designed to be removable from the hydrogen gas supplying unit.

FIG. 5 shows an embodiment in which the main body portion of the power generating unit 1 may be removably mounted to the hydrogen gas supplying unit 2.

In the present embodiment, two valves 3-1 and 3-2 are provided between the main body portion of the power generating unit 1 and the hydrogen gas supplying unit 2 and a mounting/dismounting mechanism 21 is provided between these two valves 31 and 3-2. Thus, after closing the valves 3-1 and 3-2, the main body portion of the power generating unit 1 may be dismounted from the hydrogen gas supplying unit 2 by the mounting/dismounting mechanism 21.

If the main body portion of the power generating unit 1 is designed to be detached in this manner from the hydrogen gas supplying unit 2, the main body portion of the power generating unit may be used conveniently as a power supply for portable equipment.

As the power supply for portable equipment, primary cells, typified by an alkaline cell or a manganese cell, and secondary cells, typified by nickel-cadmium cell, a nickel-hydrogen cell or a lithium ion cell, are commonly used, these cells being unexceptionally chemical cells the chemical reaction of which is completed in a closed space. For this reason, variegated elements that make up these cells, such as a cathode material, an anode material, a separator, a liquid electrolyte, a safety device, and a hermetically sealable vessel for these components, are designed monolithically.

Thus, if a chemical cell is used as power supply for a portable equipment, and the cell capacity is depleted, it is necessary to exchange the cell itself, while it is not possible to exchange only certain cell components. Thus, in order to prevent cell depletion, the user has to carry a plural number of cells.

However, if a fuel cell is used as a power supply for a portable equipment, power generation is possible on supplying hydrogen and oxygen as fuel from outside. Thus, by providing the main body portion of the power generating unit 1 on the side portable equipment, and by a user replenishing hydrogen to the main body portion of the power generating unit from time to time, the user does not have to carry a plural number of the fuel cells but has to carry only one main body portion of the power generating unit 1, thus significantly improving user friendliness.

The present invention is now explained with reference to Examples and a Comparative Example.

EXAMPLE 1

First, a fullerene derivative, $C_{60}$—$(OSO_3H)_x(OH)_y$, where $2 \leq x$ and $y \leq 12$, and vinyl chloride, were mixed together at a ratio of 5:1, with THF as a solvent, and coated on a glass substrate in accordance with a doctor blade method. After drying, the glass substrate was pressed to form a thin film of 25 μm in thickness to form the proton conductor unit 6. The pressing was carried out under a pressure of 6 t/cm$^2$.

Then, carbon black, carrying platinum, and mixed powders of perfluorosulfonic resin, was sprinkled on a carbon sheet to prepare the hydrogen electrode 4 and the oxygen electrode 5.

The proton conductor unit 6 then was sandwiched between the hydrogen electrode 4 and the oxygen electrode 5 to form a MEA. The plan shape of the MEA was set to a circular shape of 7 cm$^2$. This MEA was used as the main body portion of the power generating unit 1 shown in FIG. 1.

3.5 g of activated LaNi$_5$ were then provided and used as the hydrogen occlusive material 16 shown in FIG. 1 to form the hydrogen gas supplying unit 2. The hydrogen emission equilibrium pressure of LaNi$_5$ at ambient temperature was approximately 2.5 atm.

The valve 17 then was opened to introduce the hydrogen gas from the hydrogen tank 18 into the hermetically sealable vessel 15 to have hydrogen occluded in LaNi$_5$ as the hydrogen occlusive material 16. The hydrogen gas supply pressure was adjusted by the regulator 19 to about 3.0 atm at ambient temperature.

The valve 17 was closed, while the valves 3 and 8 were opened to effect hydrogen purging of the hermetically sealable vessel 7. The valve 8 then was closed. This produced a voltage of 0.6 V across the cathode lead 13 and the anode lead 14, such that the current of 200 mA was caused to flow through a load connected across the cathode lead 13 and the anode lead 14. The voltage across the cathode lead 13 and the anode lead 14 and the current flowing through the load were kept at the above values for 5.2 hours as from the start of power generation. As from the time lapse of 5.2 hours since the start of power generation, the voltage across the cathode lead 13 and the anode lead 14 was decreased rapidly due to shortage in the hydrogen gas.

Suppose that the totality of hydrogen occluded in LaNi$_5$ has been consumed by power generation. Since the duration of power generation is 5.4 hours, the fact that the power generation continued for 5.2 hours indicates that 96% of hydrogen occluded in LaNi$_5$ was used for power generation.

From the above, it is seen that the major portion of hydrogen occluded in LaNi$_5$ was consumed for power generation and hence that there was scarcely any hydrogen gas emitted to atmosphere by transmission or consumed without contributing to power generation due to transmission of the oxygen gas.

EXAMPLE 2

The hydrogen tank 18 was directly coupled to the main body portion of the power generating unit 1 used in Example 1, through the regulator 19, to prepare a power generation device shown in FIG. 4.

The valve 3 then was opened to introduce the hydrogen gas from the hydrogen tank 18 into the hermetically sealable vessel 7. At this time, the hydrogen gas supply pressure was set by the regulator 19 to approximately 1.8 atm at ambient temperature. An integrating flowmeter, not shown, for measuring the flow of the hydrogen gas introduced into the hermetically sealable vessel 7 was mounted in the vicinity of the valve 3.

The valve 8 then was opened to effect hydrogen purging of the hermetically sealable vessel 7. The valve 8 then was closed. Thus, a voltage of 0.6V was generated across the cathode lead 13 and the anode lead 14 and the current of 200 mA flowed through the load connected across the cathode lead 13 and the anode lead 14. The voltage across the cathode lead 13 and the anode lead 14 and the current flowing through the load were maintained at the above values until lapse of 5.3 hours as from the start of the power generation. After the lapse of 5.3 hours as from the start of the power generation, the voltage across the cathode lead 13 and the anode lead 14 was decreased rapidly due to deficiency of the hydrogen gas.

When the amount of hydrogen, indicated by the integrating flowmeter, was used up for power generation, the duration of the power generation amounted to 5.4 hours. Thus, the fact that the power generation continued for 5.3 hours indicates that 98% of hydrogen supplied from the hydrogen tank 18 was used for power generation.

The above shows that almost all of hydrogen supplied from the hydrogen tank 18 was used up for power generation. It was thus seen that there was scarcely any hydrogen gas emitted to atmosphere by transmission or consumed without contributing to power generation as a result of transmission of the oxygen gas.

EXAMPLE 3

Measurement were conducted under the same condition as in Example 1 except changing the hydrogen occlusive material 16 to $LmNi_5$.

It is noted that Lm is La, Ce, Pr, Nd, Ni, Co, Mn and Al with the proportions of 12.94 wt %, 5.02 wt %, 3.14 wt %, 11.91 wt %, 60.22 wt %, 2.81 wt %, 3.26 wt % and 0.70 wt %, respectively. The hydrogen emission equilibrium pressure of $LmNi_5$ at ambient temperature was approximately 1 to 2 atm.

In the present embodiment, a voltage of 0.6V was generated across the cathode lead 13 and the anode lead 14 and the current of 200 mA flowed through the load connected across the cathode lead 13 and the anode lead 14. The voltage across the cathode lead 13 and the anode lead 14 and the current flowing through the load were maintained at the above values until lapse of 4.9 hours as from the start of the power generation. After the lapse of 4.9 hours as from the start of the power generation, the voltage across the cathode lead 13 and the anode lead 14 was decreased rapidly due to deficiency of the hydrogen gas.

If all of hydrogen occluded into $LmLi_5$ is used for power generation, the duration of power generation is 5.1 hours. Thus, the fact that the power generation continued for 4.9 hours indicates that 96% of hydrogen occluded in $LmNi_5$ was used for power generation.

The above shows that almost all of hydrogen occluded in $LmNi_5$ was used for power generation. It was thus seen that there was scarcely any hydrogen gas emitted to atmosphere by transmission or consumed without contributing to power generation due to transmission of the oxygen gas.

COMPARATIVE EXAMPLE

Measurements were conducted under the same condition as in Example 2 except changing the hydrogen gas supplying pressure, adjusted by the regulator 19, to 0.5 atm.

In the present Comparative Example, a voltage of 0.4V was generated across the cathode lead 13 and the anode lead 14 and the current of 200 mA flowed through the load connected across the cathode lead 13 and the anode lead 14. The voltage across the cathode lead 13 and the anode lead 14 and the current flowing through the load were maintained at the above values until lapse of 4.9 hours as from the start of the power generation. After the lapse of 2.2 hours as from the start of the power generation, the voltage across the cathode lead 13 and the anode lead 14 was decreased rapidly due to deficiency of the hydrogen gas.

When the amount of hydrogen, indicated by the integrating flowmeter, was used up for power generation, the duration of the power generation amounted to 5.5 hours. Thus, the fact that the power generation continued for 2.2 hours indicates that 40% of hydrogen supplied from the hydrogen tank 18 was used for power generation.

It may be seen from above that the major portion of hydrogen supplied from the hydrogen tank 18 was emitted to atmosphere due to transmission.

In the present power generation apparatus, described above, in which the hydrogen gas at approximately 0.2 atm to approximately 3.5 atm is supplied to the main body portion of the power generating unit 1, the proton conductor unit 6 of which uses a fullerene derivative, transmission of hydrogen and oxygen gases may be prohibited effectively. Since it is unlikely that the hydrogen gas is emitted to atmosphere due to transmission or that the oxygen gas reaches the hydrogen electrode 4 due to transmission to consume hydrogen without hydrogen contributing to power generation, the power generation efficiency can be raised significantly.

The present invention is not to be limited to the embodiments, as now explained, but a number of modifications may be made as defined in the claims. These modification are naturally comprehended within the scope of the invention.

For example, in the above-described embodiment, a so-called self-sustaining film is used as the proton conductor film without using a separator. However, a separator may be used in conjunction with the proton conductor film. Specifically, such a proton conductor film may be used which may be obtained on coating a liquid mixture of fullerenol and liquid tetrahydrofuran on a sheet which is formed e.g., of polypropylene and which is formed with numerous through-holes, and on drying the resulting product. The meritorious effect of the above-described embodiment can be obtained with the use of this proton conductor film.

With the power generation apparatus according to the present invention, transmission of hydrogen and oxygen gases may be suppressed effectively to raise the power generation efficiency.

The invention claimed is:

1. A power generation apparatus comprising:
a proton conductor unit having, as a matrix, a carbonaceous material which is mainly composed of carbon and into which proton dissociating groups are introduced,
a hydrogen electrode bonded to one surface of said proton conductor unit,
an oxygen electrode bonded to the other surface of said proton conductor unit, and
means for supplying a hydrogen gas to said hydrogen electrode, said supplying means comprising: a hydrogen tank, a hydrogen occluding material enclosed in a hermitically sealed vessel, the hermitically sealed vessel fluidly connected to the hydrogen tank, the hydrogen emitting equilibrium pressure of said hydrogen occluding material is approximately 0.2 to 3.5 atm, and a regulator for adjusting the pressure of the hydrogen gas supplied from said hermetically sealed vessel to said hydrogen electrode to approximately 0.2 to approximately 3.5 atm, wherein said proton conductor unit includes a fullerene derivative.

2. The power generation apparatus according to claim 1 wherein an apparatus portion made up of said proton conductor unit, hydrogen electrode and the oxygen electrode and said supplying unit are designed to be removable.

3. The power generation apparatus according to claim 1 wherein said hydrogen occluding material is a hydrogen occluding alloy.

4. The power generation apparatus according to claim 3 wherein said hydrogen occluding material contains LaNi5.

5. The power generation apparatus according to claim 1 wherein said hydrogen occluding material is a carbonaceous hydrogen occluding material.

6. The power generation apparatus according to claim 5 wherein said carbonaceous hydrogen occluding material is at least one material selected from the group consisting of fullerene, carbon nano-fibers, carbon nano-tubes, carbon soot, nano-capsules, Bucky onion end carbon fibers.

7. The power generation apparatus according to claim 1 wherein said hydrogen occluding material is an alkali metal halide, an aqueous solution or a gel thereof.

8. The power generation apparatus according to claim 1 wherein said fullerene derivative is defined by $$C_{60}-(OSO_3H)_x(OH)_y$$

where $2 \leq x$ and $y \leq 2$.

9. The power generation apparatus according to claim 1 wherein said supplying means includes a second regulator for adjusting the pressure of the hydrogen gas supplied from said hydrogen tank to approximately 0.2 to approximately 3.5 atm.

* * * * *